Oct. 27, 1931.  J. BAYERLEIN ET AL  1,829,080
AIRCRAFT
Filed Oct. 25, 1930  2 Sheets-Sheet 1
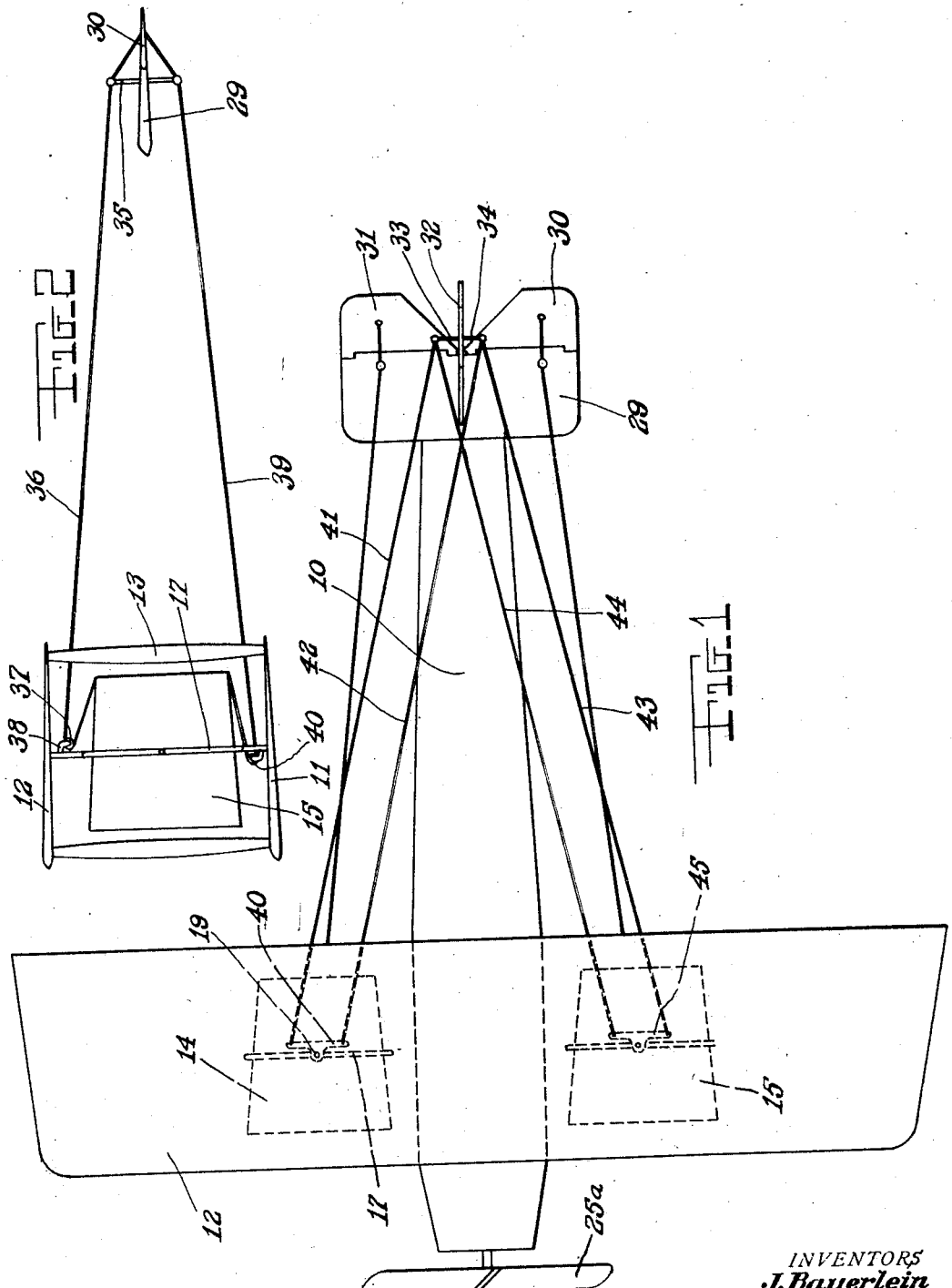
INVENTORS
J. Bayerlein
A. A. Seiler
J. Ledermann
BY THEIR ATTORNEY

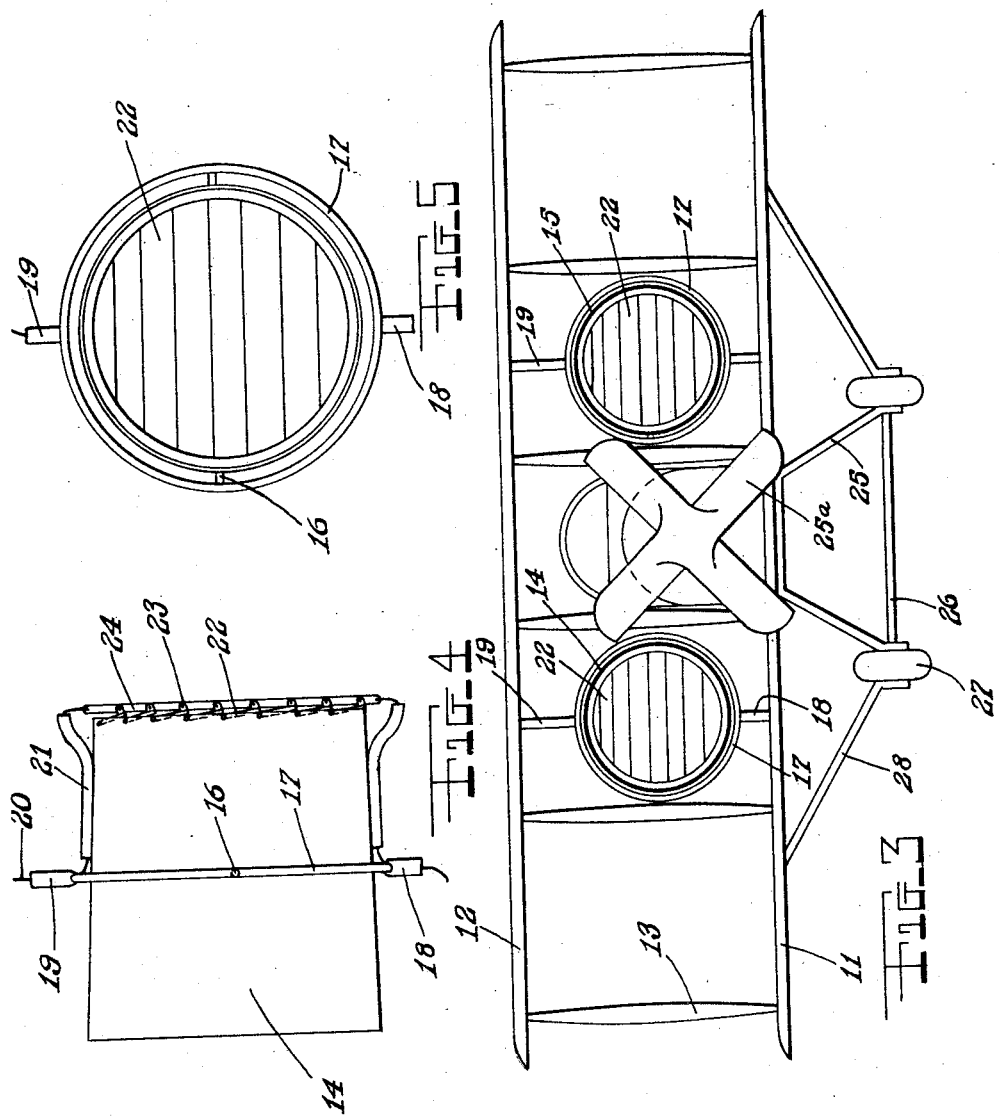

Patented Oct. 27, 1931

1,829,080

UNITED STATES PATENT OFFICE

JOHN BAYERLEIN, OF MASPETH, AND ANTON A. SEILER, OF NEW YORK, N. Y.

AIRCRAFT

Application filed October 25, 1930. Serial No. 491,112.

The main object of this invention is to provide a device used for controlling the ascent and descent of a heavier-than-air or lighter-than-air-craft.

Another object of the invention is to provide means for maneuvering an aircraft of the heavier-than-air or lighter-than-aircraft type and provides cylinders which are mounted between or above or beneath the wings of either a biplane or a monoplane and is so constructed as to affect the steering of the craft by being adjusted to various angles.

Still another object of the invention is to provide an aircraft with cylinders or funnels through which the air stream passes from the propeller wash, said funnels being so constructed as to affect the steering of the aircraft in ascent, descent or bank.

A still further object of the invention is to provide an aircraft with means for rapid ascent, descent or bank and is provided with means thereon for braking the momentum of the craft when landing.

The above and other objects will become apparent in the description below in which characters of reference refer to like parts in the drawings.

Referring briefly to the drawings, Figure 1, is a top plane view of an aeroplane showing the control means mounting in place thereon.

Figure 2 is a side elevation view of one end of the aeroplane showing the means of adjusting the control funnels and elevator surfaces.

Figure 3 is a front elevational view of Figure 1.

Figure 4 is a side elevation view of the control funnel per se showing the arrangement of the braking shutters in closed position.

Figure 5 is the front elevation view of Figure 4.

Referring in detail to the drawings the numeral 10 indicates the body or fuselage of a conventional type of aeroplane. At the forward end of the fuselage a lower wing 11 and an upper wing 12 is located. The upper wing being directly superimposed over the lower wing. These wings and fuselage are perfectly streamlined so that speeds may be attained with the craft. The upper and lower wings 12 and 11 respectively, are retained and braced in their proper relation by struts 13 which are arranged in spaced-apart relation to each other and are situated along the entering and trailing edges of the wings. On each side of the fuselage between a pair of companion struts funnels 14 and 15 are positioned. These funnels are substantially cylindrical in shape and are supported upon horizontal, axial studs 16. These studs are anchored to an encircling ring 17 which forms the supporting frame for the cylinders. The ring has a pair of diametrically opposed kingpins 18 and 19. The kingpins are anchored in the body of the wings at the position shown in Figure 1. These kingpins are preferably of hollow construction in order to permit the passage therethrough of cables 20 by which means the braking device hereinafter described is controlled. The cables 20 pass longitudinally along one-half of the cylinders through conduits 21. The rear or trailing edge of the funnels indicated by the numerals 14 and 15 are provided with shutters which lock the air stream within the funnel and effectively brake the momentum of the aircraft. These shutters are linear strips of material one overlapping the other in the arrangement indicated by the numeral 22. The upper corners of these shutters, indicated by the numeral 22, are pivoted in the marginal edge of the funnels 14 and 15 and midway of their length near their lower edges are provided with ears 23. The ears of all of the shutters are connected to a single opener bar 24. To the upper and lower ends of this opener bar the cables 20 are secured.

The aircraft is provided with the usual wheeled under-carriage comprising landing struts 25 to which an axle is secured. This axle has wheels 27 mounted thereon and additional braces 28 are used to attain sufficient rigidity.

At the rear end of the fuselage the control surfaces and stabilizers are located. The fuselage has secured thereto at its rear end the rigid stabilizer fin 29 to which one end movable elevators 30 and 31 are pivotally attached. Between the elevators 30 and 31 a vertical rudder 32 is pivotally mounted upon the rigid stabilizer fin 29. The rudder is provided with a pair of opposed posts 33 and 34 and the stabilizer fins are also provided with similar posts 35 which project downwardly and upwardly from the stabilizer surface.

In order to permit the funnels to aid in the control of the aircraft for ascent or descent the funnels must be rotatable through a small arc in a horizontal plane and to permit the funnels to aid the rudder of the aircraft these same funnels must also be rotatable through a small degree of arc in a vertical plane. For this reason the funnels are mounted in the ring frames 17 as previously mentioned. The rear upper corner of the upper edge of the funnels have an elevating cable 36 secured thereto. This cable traces around a pulley 37 which is rotatably mounted on an offset bracket 38. The cable passes about this pulley and extends rearward and then passes through the upper post 35 mounted on the stabilizer 29 and thence is directly secured to either of the elevators 30 or 31. A second cable 39 is secured to the lower edge of the cylinders or funnels 14 and 15 and thence passes around a pulley 40 and passes rearward through the lower post 35 and is connected to the under side of the elevator of either of the elevator fins 30 or 31. With this arrangement it will be seen that as the elevators are moved by the control stick of the aircraft the funnels will likewise be tilted in either direction and in the same direction as the elevators are tilted. The posts 33 and 34 on the rudder 32 each have a pair of cables secured thereto. The kingpin 19 of each of the funnels has a lever 40 secured thereto and each of these levers has a pair of cables 41 and 42 secured to its ends. The cable 41 is secured to the post 33 while the cable 42 is secured to the post 34. A second pair of cables 43 and 44 are used with the opposing funnel 15. These cables are secured to a second lever 45 and thence are separately connected to the posts 33 and 34 which form part of the rudder.

The funnels illustrated as mounted on the aircraft shown on the accompanying drawings are adapted to tilt and rotate in a horizontal plane in unison with the corresponding control movements of the rudder 32 and the elevator surfaces 30 and 31. These funnels are adapted to be moved by the operator's stick. The funnels are adapted to be used to attain a rapid ascent or descent when mounted upon aircraft or flying machine or zeppelin type. The sensitivity of the funnels is such that stabilization occurs in all positions of the aircraft or flying machine. The shutters may be used as the means for braking the momentum of the aircraft when landing or they may be used to retard the air rush through the cylinders to prevent and eliminate the shock of sudden maneuvering. Assuming that the cylinders are rotated about the kingpins 19 by means of the pilot stick the rudder 32 is simultaneously moved by means of the sets of cables 41 and 42 and 43 and 44. When it is desired to change the position of the elevators 30 and 31 the funnels must likewise be tilted in unison with the lifting or lowering of the elevators. This is accomplished through the medium of the cables 36 and 39 in the arrangement shown in Figure 2.

The wash of the propeller 25a passes through the cylinders and is utilized in the device.

The cylinders taper lengthwise having smaller ends at the rear so that the air stream in passing therethrough is partly compressed to permit a greater efficiency of operation.

It is to be noted that certain changes in form and construction may be made without departing from the spirit and scope of the invention.

We claim:

1. In an aircraft, cylinders mounted on the wings of the aircraft adapted to have the air stream pass therethrough, means for adjusting the positions of said funnels for controlling the maneuvering of the aircraft, means for baffling the air stream passing through said cylinders, and means connected to the steering surfaces of said aircraft and said funnels for attaining simultaneous movement of the steering surfaces and said funnels.

2. In an aircraft, cylinders mounted on the wings of the aircraft adapted to have the air stream pass therethrough, ring frames pivoted vertically on said wings, said cylinders being pivoted in said rings, means for baffling the air stream passing through said cylinders and means connected to the steering surfaces of said aircraft and said funnels for attaining simultaneous movement of the steering surfaces and said funnels.

3. In an aircraft, cylinders mounted on the wings of the aircraft adapted to have the air stream pass therethrough, ring frames pivoted vertically on said wings, said cylinders being pivoted in said rings, studs mounted diametrically opposite each other in a horizontal plane on said ring frame, said studs having said cylinders secured thereto, said studs and ring frame permitting a horizontal and vertical movement of said cylinders, means or baffling the air stream passing through said cylinders, and means connected to the steering surfaces of said aircraft and said funnels.

4. In an aircraft, cylinders mounted on the wings of the aircraft adapted to have the air stream pass therethrough, ring frames pivoted vertically on said wings, said cylinders being pivoted in said rings, the axes of said cylinders being in a horizontal plane, studs mounted diametrically opposite each other in a horizontal plane on said ring frames, said studs being rotatably secured to said cylinders on the horizontal axis of said cylinders, said studs and ring frame permitting a horizontal and vertical movement of said cylinders, means on said cylinders for baffling the air stream passing therethrough and means connected to the steering surfaces of said aircraft and said funnels for maneuvering said aircraft.

5. In an aircraft, cylinders mounted on the wings of the aircraft adapted to have the air stream pass therethrough, ring frames pivoted vertically on said wings, said cylinders being pivoted in said rings, the axis of said cylinder being in a horizontal plane, studs mounted diametrically opposite each other in a horizontal frame on said ring frames, said studs being rotatably secured to said cylinders on the horizontal axis of said cylinders, said studs and ring frame permitting a horizontal and vertical movement of said cylinders, horizontal shutters pivotally suspended from the trailing edge of said cylinders, means connected to said shutters for opening and closing said shutters, means connected to the steering surfaces of said aircraft and said funnels for maneuvering said aircraft.

6. In an aircraft, cylinders mounted on the wings of the aircraft adapted to have the air stream pass therethrough, ring frames pivoted vertically on said wings, said cylinders being pivoted in said rings, the axis of said cylinder being in a horizontal plane, studs mounted diametrically opposite each other in a horizontal frame on said ring frames, said studs being rotatably secured to said cylinders on the horizontal axis of said cylinders, said studs and ring frame permitting a horizontal and vertical movement of said cylinders, horizontal shutters pivotally suspended from the trailing edge of said cylinders, an opener bar pivotally connected to said shutters and cables secured to both ends of said opener bar adapted to be manipulated to open and close said cylinders.

7. In an aircraft, cylinders mounted on the wings of the aircraft adapted to have the air stream pass therethrough, ring frames pivoted vertically on said wings, said cylinders being pivoted in said rings, the axis of said cylinder being in a horizontal plane, studs mounted diametrically opposite each other in a horizontal frame on said ring frames, said studs being rotatably secured to said cylinders on the horizontal axis of said cylinders, said studs and ring frame permitting a horizontal and vertical movement of said cylinders, horizontal shutters pivotally suspended from the trailing edge of said cylinders, a lever secured to said vertical pivoted position of said ring frame, cables secured to said lever extending to opposite sides of said rudder is simultaneously operating said rudder and rotating said cylinder and means for moving said elevators simultaneously with the tilting of said cylinders.

8. In an aircraft, cylinders mounted on the wings of the aircraft adapted to have the air stream pass therethrough, ring frames pivoted vertically on said wings, said cylinders being pivoted in said rings, the axis of said cylinders being in a horizontal plane, studs mounted diametrically opposite each other in a horizotnal frame on said ring frames, said studs being rotatably secured to said cylinders on the horizontal axis of said cylinders, said studs and ring frame permitting a horizontal and vertical movement of said cylinders, horizontal shutters pivotally suspended from the trailing edge of said cylinders, a lever secured to said vertical pivoted position of said ring frame, cables secured to said lever extending to opposite sides of said rudder is simultaneously operating said rudder and rotating said cylinder, a pair of cables secured to the forward and rear edges of said cylinders adapted to tilt said cylinders, said cables being secured to the elevators of the aircraft for simultaneously operating the cylinders and the elevators.

9. In an aircraft, cylinders mounted on the wings of the aircraft adapted to have the air stream pass therethrough, ring frames pivoted vertically on said wings, said cylinders tapering lengthwise having their smaller openings at the trailing edge thereof, said cylinders being pivoted in said ring frames, the axis of said cylinders being in a horizontal plane, studs mounted diametrically opposite each other in a horizontal plane on said ring frames, said studs being rotatably secured to said cylinders on the horizontal axis of said cylinders, said studs and ring frame permitting a horizontal and vertical movement of said cylinders, horizontal shutters pivotally suspended from the trailing edge of said cylinders, a lever secured to said vertical pivot of said ring frame, cables secured to said lever extending to the opposite sides of said rudder for simultaneously operating said rudder and rotating said cylinder and means for moving said elevators simultaneously with the tilting of said cylinders.

In testimony whereof we affix our signatures.

JOHN BAYERLEIN.
ANTON A. SEILER.